June 15, 1937.   H. T. AMES   2,084,120
HEADLIGHT STRUCTURE
Filed July 19, 1934   5 Sheets-Sheet 1

Inventor
Harold T. Ames
By Fred Gerlach
his Atty.

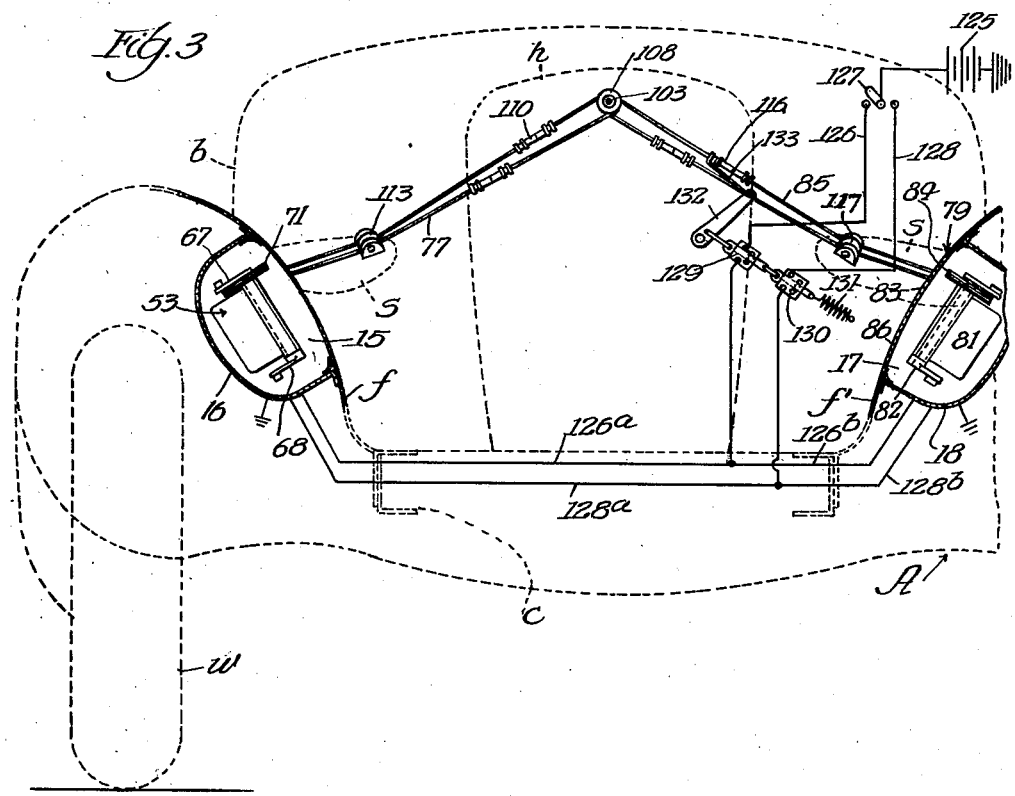
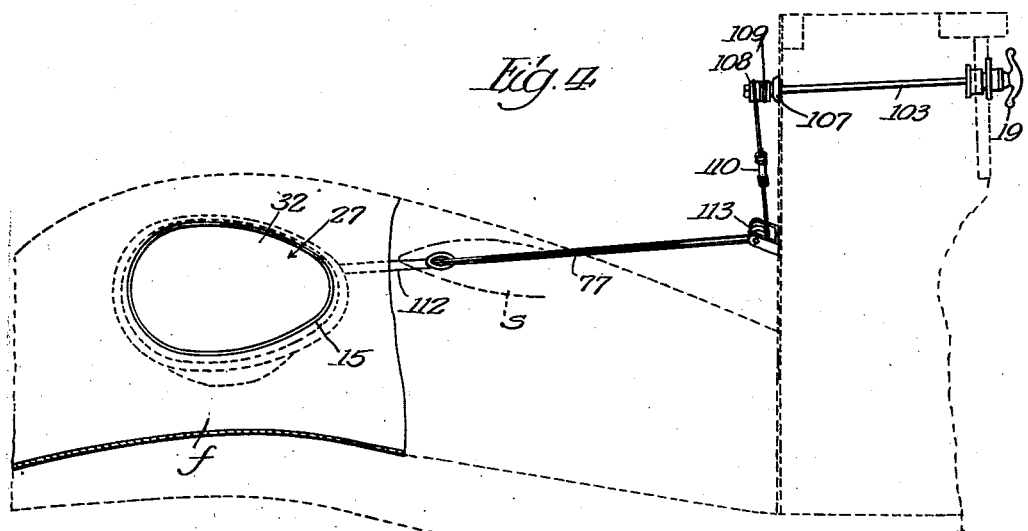

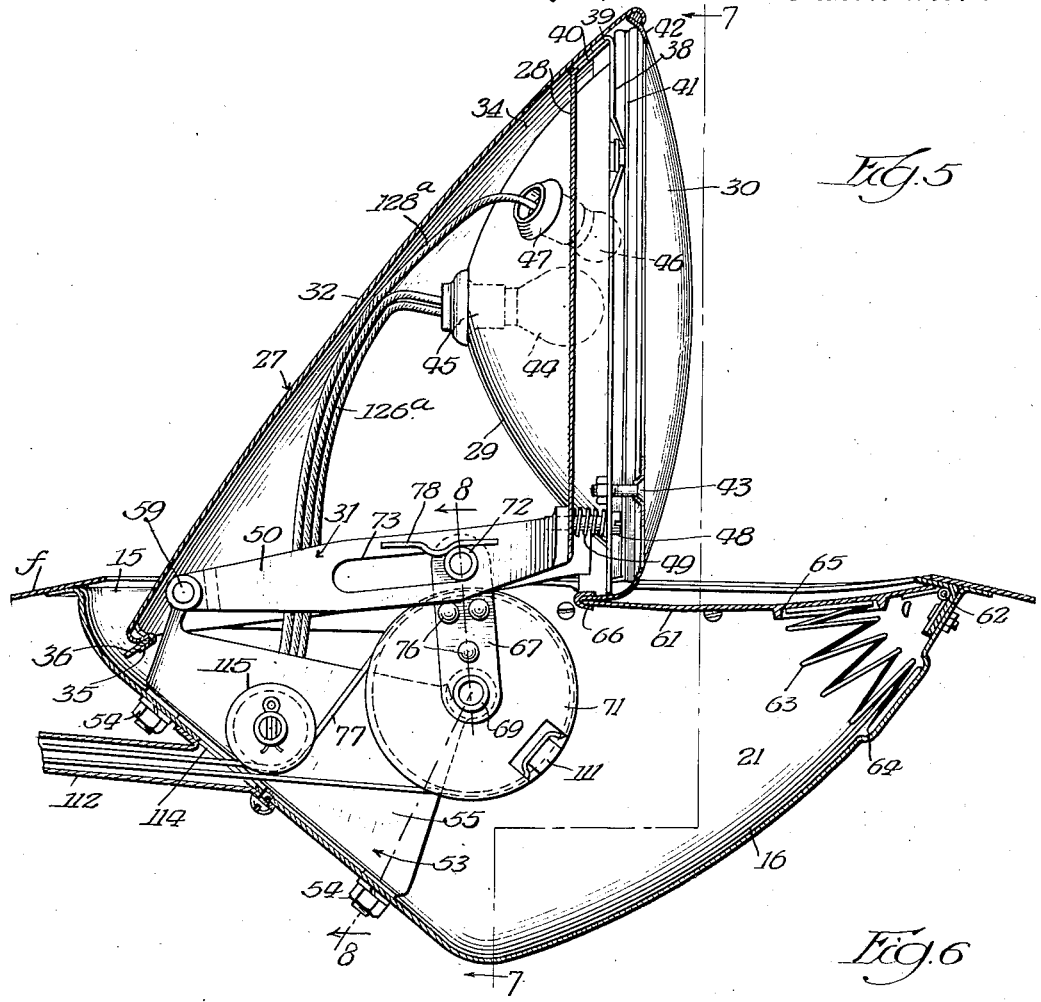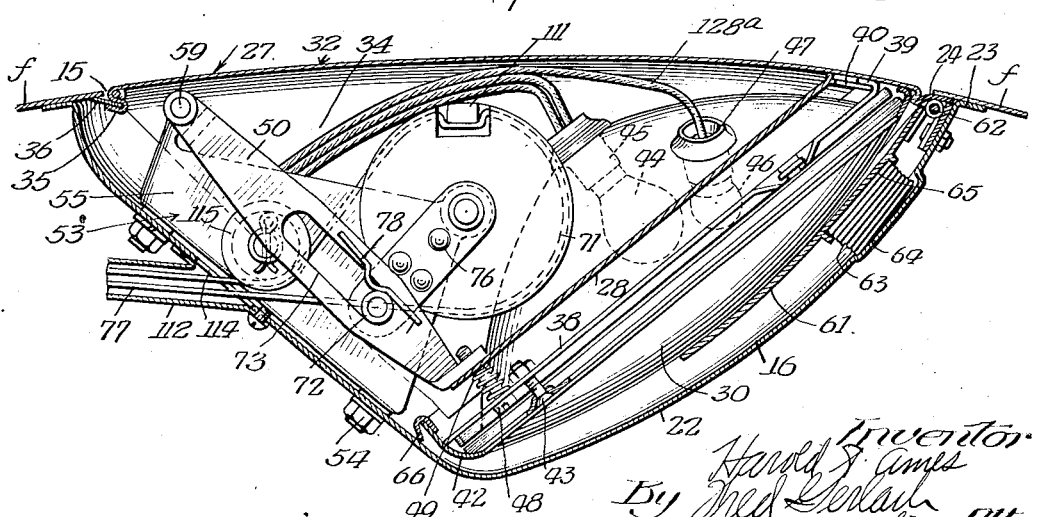

June 15, 1937.  H. T. AMES  2,084,120
HEADLIGHT STRUCTURE
Filed July 19, 1934   5 Sheets-Sheet 4
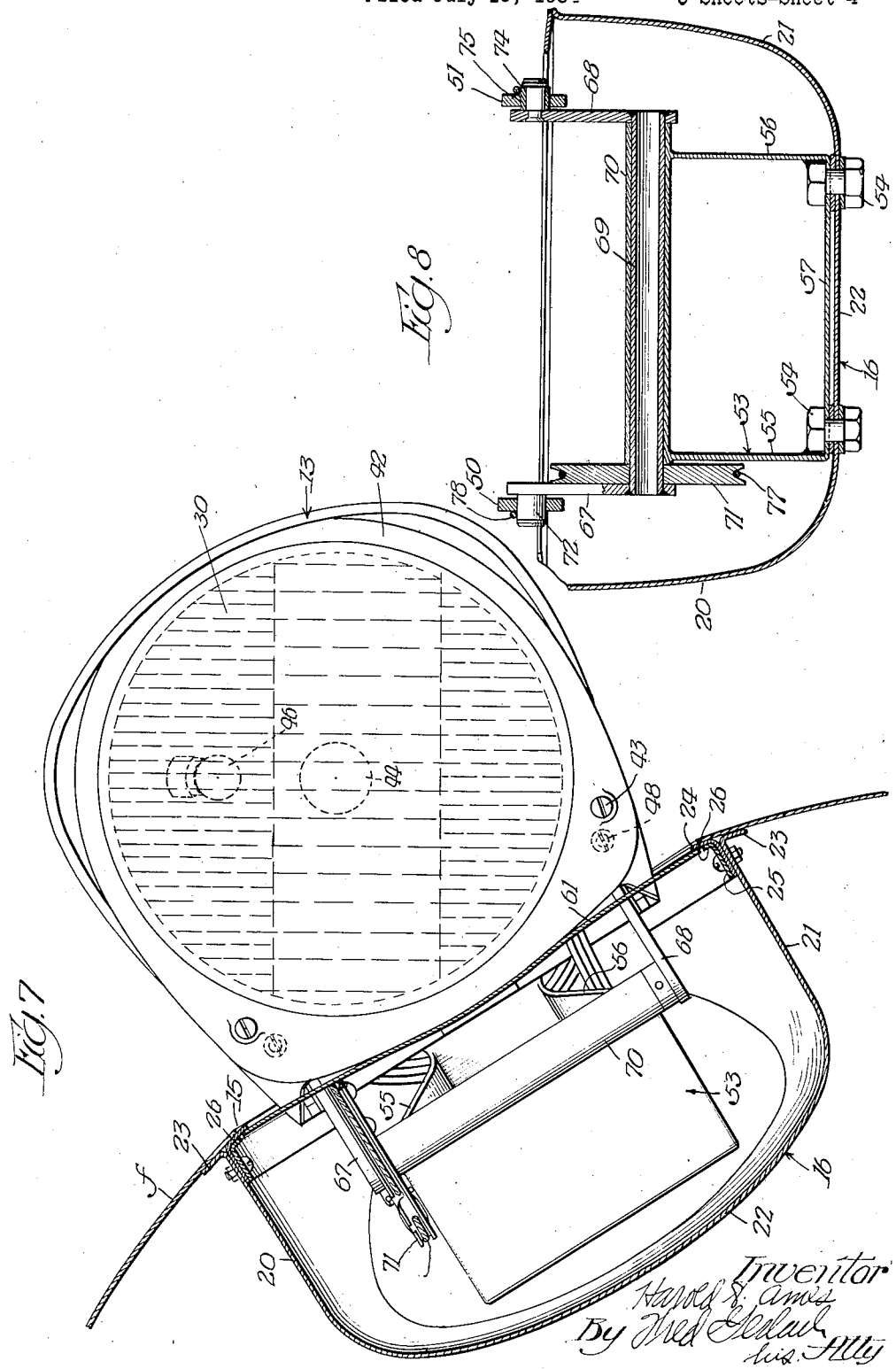

June 15, 1937. H. T. AMES 2,084,120
HEADLIGHT STRUCTURE
Filed July 19, 1934 5 Sheets-Sheet 5
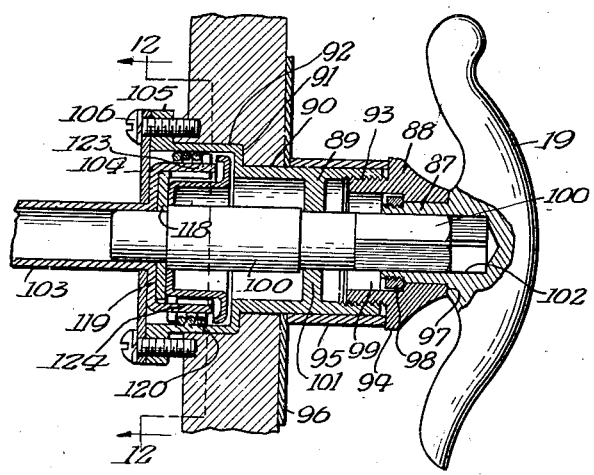
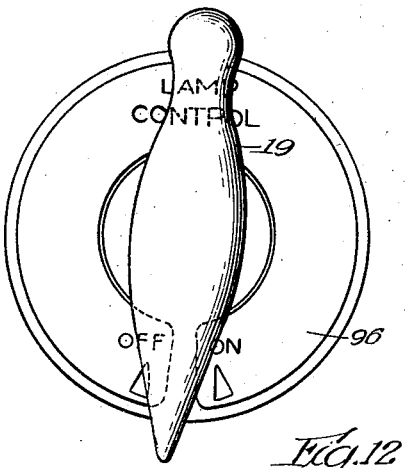
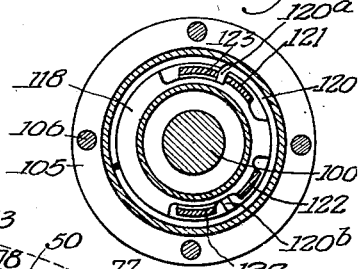
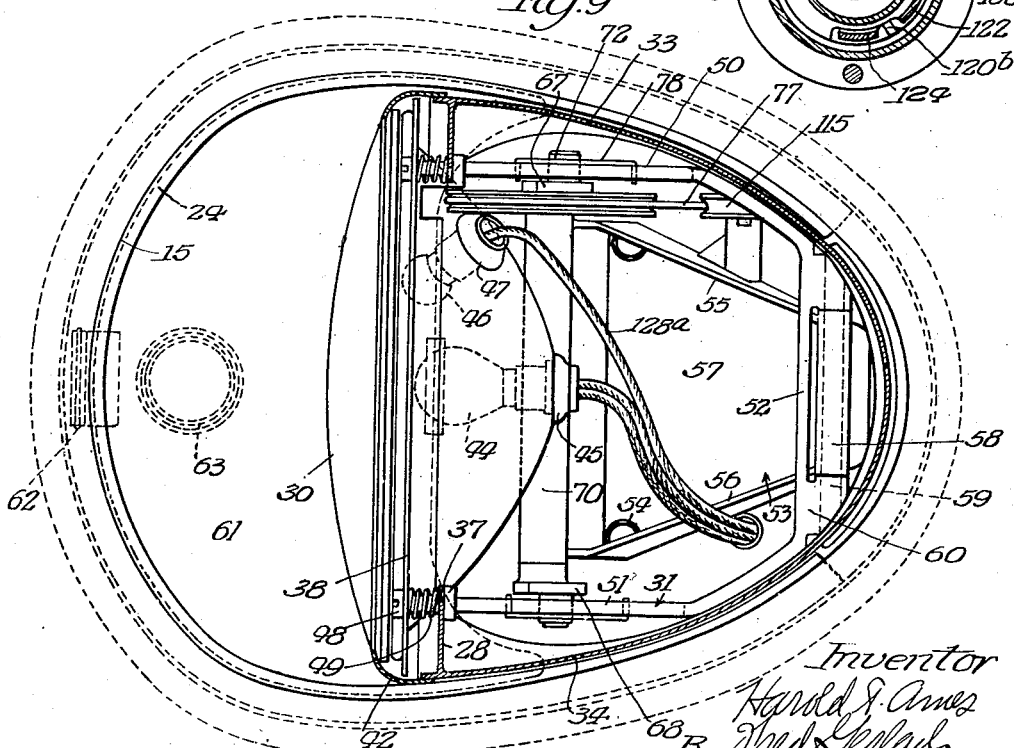

Patented June 15, 1937

2,084,120

UNITED STATES PATENT OFFICE 2,084,120

HEADLIGHT STRUCTURE

Harold T. Ames, Chicago, Ill., assignor to The Cord Corporation, Chicago, Ill., a corporation of Delaware Application July 19, 1934, Serial No. 735,931

18 Claims. (Cl. 240—7.1)

The present invention relates generally to headlight structures. More particularly the invention relates to that type of headlight structure which is employed in connection with an automobile and comprises a pair of electric lamps which are arranged in laterally spaced relation at the front of the automobile and operate when current is supplied thereto to project forwardly two beams or columns of light.

One object of the invention is to provide an improved headlight structure of this type in which the lamps are associated with pockets at the front of the automobile and are movably mounted so that during daytime use of the automobile they may be shifted from an operative position outside the pockets into an inoperative position wherein they are disposed wholly within the pockets, and hence do not offer resistance to the air or accumulate dust or dirt on the lenses thereof.

Another object of the invention is to provide a headlight structure of the last mentioned character in which the pockets are located under the front fenders of the automobile and the lamps embody shells of novel design which when the lamps are in their inoperative position close the pockets and complete the surface continuity of the fenders.

Another object of the invention is to provide a headlight structure of the type and character under consideration in which the lamps are shiftable conjointly into and out of their operative position by means of a control handle on the dashboard of the automobile and within reach of the driver.

A further object of the invention is the provision of means for automatically breaking the electrical circuits through the lamps when the latter are in their inoperative position in the pockets in the fenders.

A still further object of the invention is to provide a headlight structure which is generally of new and improved construction and may be manufactured at a low and reasonable cost.

The invention consists of the several novel features which are hereinafter set forth and are more particularly defined by claims at the conclusion hereof.

In the drawings which accompany and form a part of this specification or disclosure and in which like numerals and letters of reference denote corresponding parts throughout the several views:

Figure 3 is a diagrammatic view of the circuits for the lamps;

Figure 4 is a detail view of the dashboard control or actuating means for the lamps of the structure;

Figure 5 is a longitudinal section of one of the lamps showing the same in its open or operative position;

Figure 6 is a similar sectional view showing the lamp in its closed or inoperative position;

Figure 7 is a section on the line 7—7 of Figure 5;

Figure 8 is a section on the line 8—8 of Figure 5;

Figure 9 is a plan view of the lamp of Figures 5, 6, 7 and 8, the shell of the lamp being shown in section for purposes of illustration;

Figure 10 is a sectional view of the control handle for conjointly shifting the lamps of the structure into and out of their operative positions;

Figure 11 is a front view of the handle; and

Figure 12 is a transverse section on the line 12—12 of Figure 10.

Figure 1:
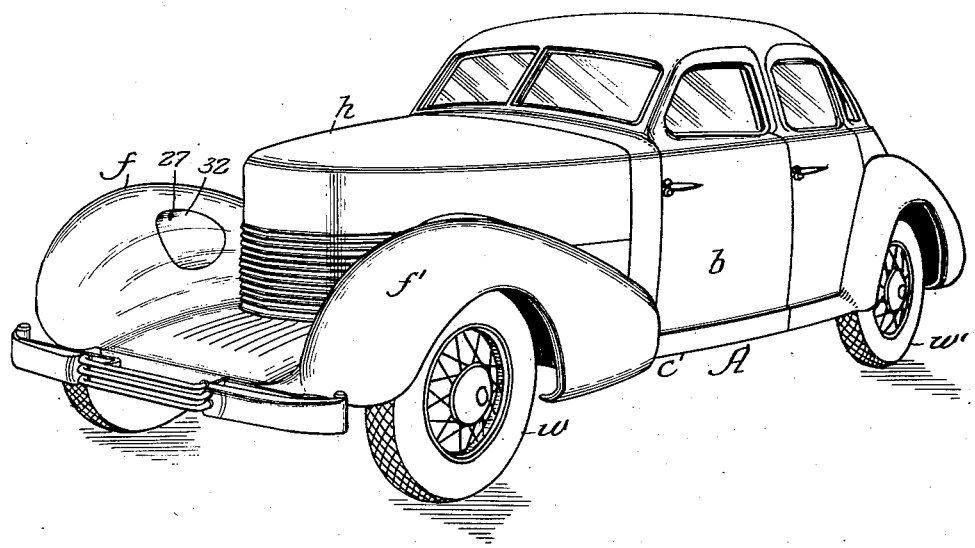
Figure 1 is a perspective of an automobile having a headlight structure embodying the invention, the lamps of the structure being shown in their inoperative position in the pockets wherein the shells complete the surface continuity of the fenders.
Figure 2:
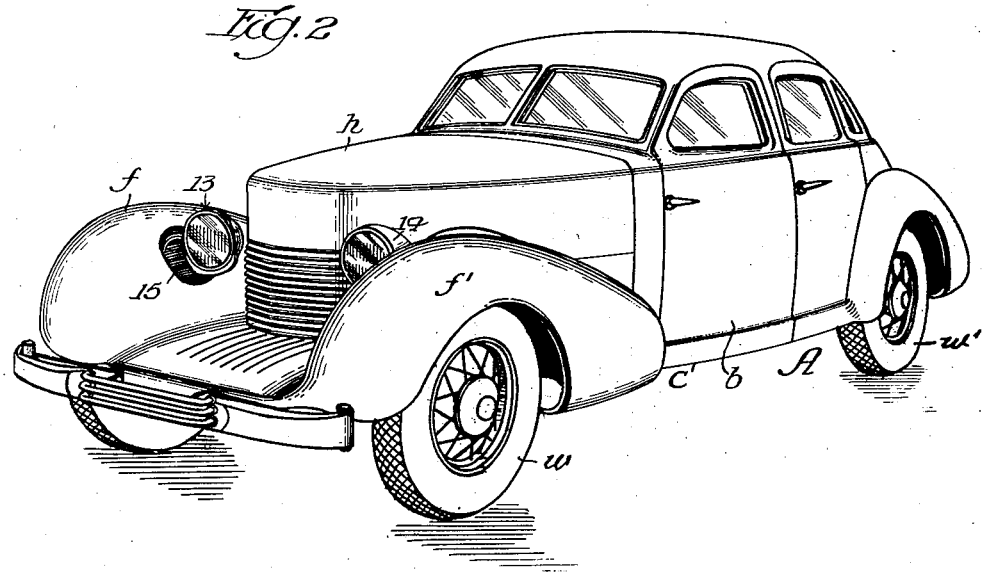
Figure 2 is a similar perspective showing the lamps of the structure in their operative position outside of the pockets.

The headlight structure which forms the subject matter of the invention is shown in connection with an automobile A. The latter, as shown in Figures 1 and 2 of the drawings, comprises a body $b$ and a chassis $c$. The chassis underlies and supports the body and has a pair of dirigible wheels $w$ at the front end thereof and a pair of traction wheels $w^1$ at its rear end. The body $b$ comprises a hood $h$ for the engine of the automobile and a pair of fenders $f$ and $f^1$ for the front wheels $w$ of the chassis. The fenders $f$ and $f^1$ are located at opposite sides of the front end of the hood and are cross-braced by means of hollow struts $s$ which as shown by dotted lines in Figures 3 and 4 extend between the sides of the hood and the inner side walls of the fenders.

The headlight structure comprises a pair of electric lamps 13 and 14. These lamps are located at the sides of the front of the hood $h$ and operate to direct forwardly beams of light for purposes of illumination. The lamp 13 is associated with the fender $f$ and is hinged as hereinafter described so that it is shiftable from an operative position between the fender $f$ and the adjacent side of the hood $h$ into an inoperative position wherein it extends through an opening 15 in the fender $f$ and is disposed in a pocket 16 on the under side of the fender. The lamp 14 is associated with the fender $f^1$ and is hinged similarly to the lamp 13 so that it is shiftable from an operative position between the fender $f^1$ and the adjacent side of the hood $h$ into an inoperative position wherein it extends through an opening 17 in the fender $f^1$ and is disposed in a pocket 18 on the under side of the fender. The pockets 16 and 18 are located in front of the hollow struts $s$ and the lamps 13 and 14 are conjointly shiftable into and out of their operative position outside of the pockets by a control handle 19 which as pointed out hereafter is mounted on the dashboard of the automobile and is subject to manipulation by the driver of the automobile A.

The opening 15 in the fender $f$ of the automobile body is oval-shaped and is located and arranged as shown in Figure 1. The pocket 16 is formed of sheet metal and consists of a top 20, a bottom 21, and a side wall 22. The side wall is centrally bent so that the pocket is substantially triangular in cross-section and is formed integrally with the top 20 and the bottom 21. The pocket 16 secured in place by means of an out-turn flange 23. The latter is formed as integral part of the top, bottom and side wall of the pocket and fits against and is soldered, welded or otherwise secured to the inner face of the portion of the fender $f$ which defines the opening 15. A piece 24 of weather-stripping is applied to the top and bottom and the front margin of the side wall 22 of the pocket and extends around the front and side portions of the opening 15. This piece of weather-stripping is secured in place by means of a U-shaped sheet metal band 25 which is riveted or bolted against the inner face of the pocket and has an inturned flange 26. The latter extends in a direction opposite to that of the flange 23 and serves to hold in place the portion of the piece of weather stripping which surrounds the front and side portions of the opening 15. The top, bottom and side wall of the pocket have no exposed holes or openings therein so that the interior of the pocket is closed except for the opening 15 and is not subject to the accumulation of mud and dirt from the wheel over which the fender $f$ is disposed.

The lamp 13 consists of a shell 27, a bulkhead 28, a reflector 29, a lens 30, and a frame 31. The shell 27 is formed of sheet metal and comprises a side wall 32, a top 33 and a bottom 34. The side wall 32 corresponds in size and shape to the opening 15. It is curved conformably to the portion of the fender $f$ around the opening 15 and serves as a cover for the opening 15 when the lamp 13 is in its inoperative position in the pocket 16. By curving the side wall 32 in this manner the lamp when in its inoperative position offers no resistance whatsoever to the air encountered during drive of the automobile. The top 33 and the bottom 34 of the shell 27 are disposed respectively adjacent to the top 20 and bottom 21 of the pocket 16 when the lamp 13 is in its inoperative position in the pocket and serve as shown in Figure 5 of the drawings to close the space between the side wall 32 and the rear end of the opening 15 when the lamp is in its operative position. The front and the top and bottom margins of the side wall 32 fit against the piece 24 of weather-stripping when the lamp 13 is in the pocket so as to seal the pocket. The rear end of the side wall 32 is provided with a U-shaped flange 35 and has a piece 36 of weather-stripping in this flange for the purpose of sealing the rear end of the opening 15. The bulkhead 28 extends across the front of the shell 27 and has a circular aperture 37 for the reflector 29. The top and bottom margins of the bulkhead are soldered or otherwise secured to the front margins of the top and bottom of the shell 27. The reflector is of the parabolic variety and is mounted in a ring-shaped support 38. The latter is connected to the side of the bulkhead 28 that is adjacent to the front end of the side wall 32 of the shell by means of a flange 39 which interlocks with a flange 40 on the bulkhead and permits the support reflector to swing forwardly and rearwardly to a slight extent for beam adjusting purposes. The marginal portion of the reflector extends through the support 38 and has an outturned flange 41 which bears against the outer face of the support. The lens 30 fits against the flange 41 and is held in place by means of a rim 42 which is attached to the front margins of the top, bottom and side wall of the shell 27. Screws 43 extend through the rim and the reflector support 38 and serve to hold the lens, reflector and reflector support in clamped relation. A large electric bulb 44 is mounted in a socket 45 in the central portion of the reflector and is adapted to be used when the automobile is being driven. A small electric bulb 46 is mounted in a socket 47 at one side of the pocket 45 and is adapted to be used as a parking light for the automobile A. When access is desired to the bulbs 44 and 46 the screws 43 are removed so as to release the lens 30. In order to adjust the direction of the beam of light emanating from the reflector 29 when the bulb 44 is used, a pair of screws 48 are provided. These screws extend through the reflector support 38 and project into threaded sockets in the inner margin of the bulkhead 28. Compression springs 49 are mounted on the portions of the screws between the bulkhead and the reflector support and serve to prevent accidental loosening of the screws. When the screws are turned for beam adjusting purposes, the reflector support swings about the flange 40 on the outer end of the bulkhead 28. The frame 31 of the lamp 13 is disposed between the rear end of the cover-forming side wall 32 of the shell and the inner end of the bulkhead and consists of a top piece 50, a bottom piece 51 and a cross piece 52. The top piece 50 is secured at one end to the upper, inner corner of the bulkhead 28 and at its other end to the rearmost portion of the top 33 of the shell. The bottom piece 51 underlies and is parallel with the top piece 50 and is attached at one end to the inner, lower corner of the bulkhead of the lamp and at its other end to the rearmost portion of the bottom 34 of the shell. The cross piece 52 is formed integrally with and extends between the rear ends of the top and bottom pieces 50 and 51.

The lamp 13 is hinged to a bracket 53 in the rear portion of the pocket 16. This bracket is connected by bolts 54 to the rear end of the side wall 22 of the pocket and comprises a top part 55 a bottom part 56 and an intermediate or connecting part 57. The intermediate or connecting part 57 fits against the inner face of the rear part of the side wall 22 of the pocket and the bolts 54 extend through it. The top part 55 extends outwardly from the upper margin of the intermediate part 57 and is disposed beneath the top piece 50 of the frame 31 of the lamp. The bottom part 56 extends outwardly from the bottom margin of the intermediate part 57 and overlies the bottom piece 51 of the lamp frame 31. The rear end of the intermediate part 57 is bent to form a tubular hinge-part 58 for a pintle 59 and the ends of this pintle project beyond the ends of the part 58 and extend through hinge-parts 60 which abut against the ends of the hinge-parts 58 and are formed as integral parts of the cross piece 52 of the frame 31 of the lamp. The pintle 58 together with the hinge-parts 58 and 60 constitute a hinge connected whereby the clamp may be swung outwardly from its inoperative position in the pocket 16 into its operative position wherein it is disposed outside of the pocket and the lens and reflector of the lamp face forwardly or frontwardly with respect to the automobile. When the lamp is swung into its inoperative position within the pocket 16, the lens 30 is positioned adjacent the front portion of the side wall 22 of the pocket and the side wall 32 of the shell of the lamp as previously pointed out closes the opening 15 in the fender f. In order to close the front portion of the opening 15, that is, the portion which is exposed when the lamp 13 is in its operative position a sheet metal cover 61 is provided. The front end of this cover is connected by a hinge 62 to the front end of the pocket 16 so that the cover may swing from an operative position wherein it closes the front portion of the opening 15 into an inoperative position against the front portion of the side wall 22 of the pocket when the lamp is in its inoperative position in the pocket. A compression spring 63 serves to shift the cover 61 into its operative position when the lamp 13 is swung out of the pocket. One end of this spring fits within an annular seat 64 which is formed in the front portion of the side wall 22 of the pocket and the other end of the spring fits in an annular seat 65 on the inner face of the cover. The cover as shown in Figures 5 and 6 is curved conformably to the outer face of the lens 30 of the lamp so that it fits snugly thereagainst when the lamp is in the pocket. A clip 66 is formed on the portion of the lens-holding rim 42 that is nearest the pocket when the lamp is in its operative position and this clip as shown in Figure 5 extends around the rear end of the cover 61 when the lamp is in its operative position and locks the cover in place against inward movement. When the lamp is swung into its inoperative position in the pocket the clip 66 swings inwardly out of locking relation with the cover 61 and permits the latter to swing into its inoperative position against the front portion of the side wall 22 of the pocket. When the lamp is swung outwardly into its operative position the rear end of the cover 61 slides across the front or outer face of the lens 30 and towards the end of the outward movement of the lamp the rear end of the cover 61 enters the clip 66 and thus becomes locked to the latter.

The lamp 13 is swung into and out of its operative position by means of a pair of crank arms 67 and 68. These arms are mounted on the ends of a shaft 69 which is loosely mounted in a sleeve 70 and is rotated by means of a pulley 71. The sleeve 70 is secured to and formed as an integral part of the top and bottom parts 55 and 56 of the bracket 53 and extends parallel to the pintle 59 of the hinge connection between the rear end of the lamp and the rear end of the bracket. The crank arm 67 projects radially from, and is soldered or otherwise rigidly connected to, the shaft 69 and is provided at its distal end with a roller 72. This roller as shown in the drawings operates in a longitudinal slot 73 in the top piece 50 of the lamp frame 31. The crank arm 68 like the crank arm 67 projects radially from, and is soldered or otherwise rigidly connected to, the shaft 69. It is aligned with the crank arm 67 and embodies at the distal or outer end thereof a roller 74. This roller operates in a longitudinal slot 75 in the bottom piece 51 of the bracket 13 of the lamp. The pulley 71 is connected by rivets 76 to the crank arm 67 and is rotated in one direction or the other by means of a cable 77. The slots 73 and 75 are so arranged that when the pulley 71 is rotated in one direction the crank arms 67 and 68 operate through the medium of the rollers 72 and 74 and the frame 31 of the lamp to swing the lamp outwardly into its operative position. When the pulley 71 is rotated in the opposite direction the rollers operating in the slots in the top and bottom pieces of the bracket 31 swing the lamp inwardly into its inoperative position in the bracket 16. The crank arms 67 and 68 are so arranged that when the lamp is either in its operative or inoperative position they extend at right angles to the top and bottom pieces of the frame 31 and the rollers 72 and 74 are disposed in the front ends of the slots in these pieces of the frame. By so arranging the crank arms a dead center relation exists when the lamp is in either of its two extreme positions and the lamp is locked firmly in place. In order to yieldably hold the crank arms in their dead center position two snap springs 78 are provided. These springs are associated with the top and bottom pieces of the lamp frame 31 respectively and coact with the rollers on the crank arms so as to hold the rollers yieldingly in the front ends of the slots. When the crank arms are swung by the pulley 71 so as to shift the lamp 13 from its inoperative position in the pocket 16 into its operative position outside of the pocket the rollers 72 and 74 snap past the spring 78 and travel first rearwardly in the slots 73 and 75 and then forwardly. During the latter portion of their forward movement the rollers snap past the spring 78 and come to rest at the front ends of the slots.

The lamp 14 is the same in construction as the lamp 13 and embodies a shell 79. The pocket 18 corresponds in design to the pocket 16 and is provided with a bracket 81. The latter is secured to the rear portion of the side wall of the pocket 18 and supports a pintle (not shown) which coacts with the frame of the lamp 14 to form a hinge connection whereby the lamp may be shifted into and out of its inoperative position wherein it extends through the opening 17 and is disposed in the pocket 18. Shift or swinging of the lamp is effected by means of a pair of crank arms 82 which are rigidly secured to and extend radially from the ends of a shaft 83. The latter is rotatably supported by the bracket 81 similarly to the shaft 69 of the shifting means or mechanism for the lamp 13 and has a pulley 84 for rotating it. The crank arms 82 have rollers (not shown) which operate in longitudinal slots (also not shown) in the top and bottom pieces of the lamp frame. The pulley 84 is riveted or otherwise secured to the uppermost crank arm and is rotated by means of a cable 85. The shell 79 of the lamp embodies a side wall 86 which is the same in shape as the opening 17 and is curved conformably to the portion of the fender $f^1$ which defines the opening 17 so that it harmonizes with, and completes the continuity of, the surface of the fender when the lamp is in its inoperative position in the pocket 18.

The lamps 13 and 14, as previously pointed out, are conjointly shiftable into and out of their operative positions by the control handle 19 which is mounted on the dashboard of the automobile A. This handle embodies a central, forwardly extending stem 87 which is rotatably mounted in a bushing 88 at the rear end of a sleeve 89. The sleeve as shown in Figure 10 extends through a bore 90 in the dashboard of the automobile and is provided at its front end with a shoulder 91 which fits against the inner end of a counterbore 92 and prevents rearward movement of the sleeve relatively to the dashboard. The front end of the bushing 88 is of reduced diameter. It fits in the rear end of the sleeve 89 and is removably attached to the latter by means of a screw thread connection 93. The central portion of the bushing is shaped to form an enlarged outwardly extending flange 94. This flange abuts against the rear end of a collar 95 which surrounds the rear end of the sleeve 89 and engages at its front end the central portion of a circular, centrally apertured dial 96. When the bushing 88 is tightened with respect to the sleeve, the flange 94 bears against the rear end of the collar 95 and the sleeve 89 is drawn rearwardly into clamped relation with the dashboard. The stem 87 is held against axial displacement relatively to the bushing 88 by means of a shoulder 97 on the central portion of the handle and a lock nut 98. This lock nut extends around the front end of the stem and is located in a counterbore 99 in the front end of the bushing. A drive shaft 100 extends longitudinally through the sleeve 89 and is journaled in a cross wall 101 in the central portion of the sleeve. The rear end of this shaft is square and fits within a square 102 in the stem 87 of the handle 19 so that the drive shaft is connected to the handle for rotation therewith. The front end of the drive shaft fits in the rear end of a hollow driven shaft 103 and is connected as hereinafter described to rotate the driven shaft in response to turning of the control handle 19. The rear end of the driven shaft is rotatably mounted in a central hole or aperture in a circular plate 104. The latter, as shown in Figure 10 of the drawings fits against an out-turned flange 105 on the front end of the sleeve 89 and is secured in place by means of screws 106 which extend through the margin of the plate and are threaded to the flange 105. The front end of the driven shaft 103 extends through the partition between the space under the hood of the automobile and the driver's compartment. It is journaled in a bearing 107 on the front face of the partition and is provided with a pair of pulleys 108 and 109. These two pulleys are keyed or otherwise fixedly secured to the driven shaft and are mounted one in front of the other.

The cable 77 for rotating the pulley 71 is connected together at the ends thereof by means of an adjustable coupling 110 so that it is in the form of a loop. The portion of the cable which extends around the pulley 71 is wrapped around a finger 111 on the pulley in order to prevent slippage of the cable with respect to the pulley. From the pulley 71 the cable 77 extends through a tube 112 to a pair of corner or direction changing pulleys 113 on the partition in front of the driver's compartment of the automobile and then extends upwardly around the pulley 108. The tube 112 leads from a cable opening 114 in the rear portion of the side wall 22 of the pocket 16 through the hollow strut between the fender $f$ and the adjacent side of the hood. When the driven shaft 103 is turned in one direction by manipulation of the control handle 19 the cable 77 is operated or driven so that the pulley 71 is rotated in such manner that the crank arms 67 and 68 operate to swing the lamp 13 from its inoperative position in the pocket 16 into its operative position outside of the pocket. Upon reverse rotation of the driven shaft 103 the cable 77 rotates the pulley 71 in the opposite direction and retracts the lamp 13, that is, it shifts the lamp 13 into its inoperative position wherein it extends through the opening 15 and is disposed in the pocket 16. An idler pulley 115 is mounted on the top part 55 of the bracket 53 and serves to guide one reach of the cable through the tube 112.

The cable 85 which extends around the pulley 84 is connected at its ends by an adjustable coupling 116, so that it is in the form of a loop. It leads from the pulley 84 through a tube between the fender $f^1$ and the adjacent side of the hood $h$ of the automobile and then passes around a pair of corner or direction changing pulleys 117 and is looped around the pulley 109. By virtue of the fact that the pulleys 108 and 109 are fixed to the front end of the driven shaft 103 and are hence conjointly rotatable, the lamps 13 and 14 are shifted conjointly into and out of their operative position upon manipulation of the control handle 19.

The pulleys of the headlight structure are preferably arranged so that the lamps are swung from their inoperative position in the pockets to their operative position outside of the pockets by a full turn of the control handle 19. As shown in Figure 11 of the drawings the control handle is pointed at one end and the dial 96 has "on" and "off" markings to indicate by the position of the pointed part of the handle the position of the lamps.

In order to prevent rotation of the driven shaft 103 except by the control handle 19 a non-reversing clutch is provided between the front end of the drive shaft 100 and the rear end of the driven shaft 103. This clutch comprises a drive disk 118 on the front end of the drive shaft 100, a driven disk 119 on the rear end of the driven shaft and a clutch spring 120. The drive disk 118 is fixedly secured to the drive shaft 100 and is provided at the periphery thereof with a pair of rearwardly extending drive fingers 121 and 122. The driven disk 119 fits between the drive disk 118 and the plate 104. It is formed integrally with the rear end of the driven shaft 103 and is provided at its outer margin or periphery with a pair of rearwardly extending driven fingers 123 and 124. The spring 120 fits within the rear end of the sleeve 89 and is normally expanded into frictional engagement with the sleeve. The driven finger 123 of the driven disk 119 is positioned opposite to the drive finger 121 and one end of the spring is bent inwardly to form a piece 120ª between these two fingers. The driven finger 124 as shown in Figure 10 is disposed opposite to the drive finger 122 of the drive disk 118 and the other end of the spring 120 is bent inwardly to form a piece 120ᵇ between the last two mentioned fingers. The spring normally is expanded against the inner periphery of the front end of the sleeve 90 and locks the driven shaft 103 against rotation inasmuch as the spring ends or pieces 120a and 120b are located adjacent to the driven fingers 123 and 124. When the drive disk 118 is rotated in one direction as the result of manipulation of the control handle 19 the drive finger 121 strikes against the spring end or piece 120a and after contracting the spring so that it is rendered inoperative, drives the driven disk 119 through the medium of the finger 123. When the drive disk 118 is rotated in the opposite direction the finger 122 engages the spring end or piece 120b and after contracting the spring so as to render it inoperative drives the driven disk through the medium of the driven finger 124. By employing the clutch between the drive and driven shafts 100 and 103 there is no likelihood of the lamps 13 and 14 being swung out of their operative or inoperative position except by manipulation of the control handle 19 and the lamps are at all times locked in the positions into which they are shifted by the handle.

Current is supplied to the large or driving bulbs of the lamps 13 and 14 from a battery 125 by way of a conductor 126. The battery is shown diagrammatically in Figure 3 of the drawings and is the regular storage battery for the automobile. The conductor 126 leads from a switch 127 on the dashboard of the automobile and has branches 126a and 126b which lead respectively to the driving bulbs of the lamps 13 and 14. When the switch 127 is swung in one direction the conductor 126 is connected to the battery 125 so that current flows to the driving bulbs for lamp illuminating purposes. Current is supplied from the battery 125 to the parking bulbs for the lamps 13 and 14 by way of a conductor 128. This conductor leads from the switch 127 on the dashboard and has branches 128a and 128b which lead respectively to the parking bulbs of the two lamps. When the switch 127 is manipulated so as to connect the conductor 128 to the battery 125 current is supplied to the parking bulbs. In order to prevent the flow of current from the battery 125 to either the driving or parking bulbs when the lamps 13 and 14 are in their inoperative position in the pockets a switch 129 is included in the conductor 126 and a switch 130 is included in the conductor 128. These two switches have movable bridging parts which are connected together for conjoint movement and are normally held in their open position by a tension spring 131. The bridging parts are shifted into their closed position by means of a lever 132. This lever is pivoted at one end thereof to the partition in front of the driver's compartment of the automobile and its one end is connected by a link 133 to the adjustable coupling 116 between the ends of the cable 85. The lever 132 and the link 133 are so arranged that when the control handle 19 is turned to swing the lamps 13 and 14 into their operative position, the bridging parts of the switches 129 and 130 are moved into their closed position. When the handle 19 is turned to swing or shift the lamps into their inoperative position in the pockets in the fenders the spring 131 operates to move the bridging parts of the switches into their open position and hence no current can pass to the lamps as long as they are in their inoperative position.

The operation of the headlight structure is as follows: Assuming that the lamps 13 and 14 are in their inoperative position in the pockets in the fenders f and f¹ and it is desired to shift the lamps into their operative position, the control handle 19 is turned in the proper direction a full turn. This movement of the handle operates through the clutch between the front end of the drive shaft 100 and the rear end of the driven shaft 103 to rotate the pulleys 108 and 109 on the front end of the driven shaft. These two pulleys in turn operate the cables 77 and 85 and the latter rotate the pulleys 71 and 84 and through the medium of the crank arms swing the lamps 13 and 14 out of the pockets. During swinging of the lamps into their operative position the bridging parts of the switches 129 and 130 are moved into their closed position so that the conductors 126 and 128 are closed for the passage of current therethrough when the lamps reach their operative position. When it is desired to swing the lamps from their operative position back into the pockets the control handle 19 is turned in the opposite direction. This results in reverse movement of the cables 77 and 85 and inward swinging of the lamps 13 and 14. As the lamps swing into the pockets the tension spring 131 shifts the movable bridging parts of the switches 129 and 130 into their "off" position and hence when the lamps are in their inoperative position the conductors 126 and 128 are broken and it is impossible by manipulation of the switch 127 to light the lamps. When the lamps are in their inoperative position they offer no resistance whatsoever to the air striking against the automobile A and no dust can accumulate on the lenses of the lamps.

The herein described headlight construction is efficient in operation and may be produced at a comparatively low cost. By reason of the fact that it includes the automatically operated switches 129 and 130 there is no likelihood of the lamps being lighted while they are in their inoperative position in the pockets in the fenders. In view of the fact that the lamps when in their inoperative position are held in place by means of the hinge connections and the crank arms there is sufficient rigidity to prevent vibration of the lamps, and the latter when lighted produce steady beams of light.

Having thus described the invention, what I claim as new and desire to secure by Letters Patent is:

1. In a light structure of the character described, the combination of a pocket with an opening leading thereto, an electric lamp mounted movably with respect to the pocket so that it is shiftable bodily through the opening from an operative position outside of the pocket into an inoperative position in the pocket and vice versa, means for shifting the lamp into and out of its operative position, a cover element mounted movably in the pocket so that it is shiftable into a position wherein it closes the portion of the opening left open when the lamp is in its operative position, and means independent of the aforesaid shifting means for automatically moving the element into such position when the lamp is shifted into its said operative position.

2. In a headlight structure for a vehicle, the combination of a pocket located at the front of the vehicle and provided with an opening leading thereto, an electric lamp mounted movably with respect to the pocket so that it is shiftable bodily through the opening into an operative position outside of the pocket into an inoperative position in the pocket and vice versa, a cover element pivotally mounted in the pocket so that it is free to swing into a position wherein it closes the portion of the opening left open when the lamp is in its operative position, and a spring within the pocket for automatically swinging the element into such position when the lamp is shifted into its said operative position.

3. In a light structure of the character described, the combination of a pocket with an opening leading thereto, an electric lamp mounted movably with respect to the pocket so that it is shiftable bodily through the opening from an operative position outside of the pocket into an inoperative position in the pocket and vice versa, a cover element mounted movably in the pocket so that it is shiftable into a position wherein it closes the portion of the opening left open when the lamp is in its operative position, means for automatically moving the element into such position when the lamp is shifted into its said operative position, and means for locking the element in place after it has been moved into its aforesaid position and while the lamp is in its operative position.

4. In a light structure of the character described, the combination of a pocket with an opening leading thereto, an electric lamp mounted movably with respect to the pocket so that it is shiftable bodily through the opening from an operative position outside of the pocket into an inoperative position in the pocket and vice versa, a cover element hinged within the pocket so that it is free to swing into a position wherein it closes the portion of the opening that is left open when the lamp is in its operative position, spring means for automatically moving the element into such position when the lamp is shifted into its said operative position, and means carried by the lamp for locking the element in place after it has been swung into its aforesaid position and while the lamp is in its operative position.

5. The combination with an automobile having fenders over the front wheels thereof and hollow struts between the inner side faces of the fenders and the sides of the hood, of a pair of pockets formed in the fenders in front of the struts, a pair of head lamps associated with the pockets respectively and movably mounted so that they may be shifted from an operative position outside of the pockets into an inoperative position in the pockets and vice versa, and means for conjointly shifting the lamps into and out of their operative position comprising a control member in the driver's compartment of the automobile and motion transmitting elements between the member and the lamps having portions thereof extending through the hollow struts.

6. The combination with an automobile having fenders over the front wheels thereof and hollow struts between the inner side faces of the fenders and the sides of the hood, of a pair of pockets formed in the fenders in front of the struts, a pair of head lamps associated with the pockets respectively and movably mounted so that they may be shifted from an operative position outside of the pockets into an inoperative position in the pockets and vice versa, and means for shifting the lamps into and out of their operative position comprising cables having portions thereof extending through the hollow struts and into the pockets.

7. The combination with a vehicle having a source of electric current, of a pocket at the front of the vehicle, a lamp comprising a "bright" light bulb and a "dim" light bulb and mounted movably within the pocket so that it may be shifted from an operative position wherein it faces forwardly outside of the pocket into an inoperative position wherein it is disposed in the pocket and vice versa, means for shifting the lamp into and out of its operative position including a control handle in the operator's compartment of the vehicle, a conductor for supplying current from the source to the "bright" light bulb, a conductor for supplying current from said source to the "dim" light bulb, switch means in the operator's compartment for selectively controlling the flow of current through said conductors, a switch in said first mentioned conductor, a switch in said second mentioned conductor, and means for automatically and conjointly opening said switches when the lamp is shifted by the handle into its inoperative position in the pocket.

8. The combination with a vehicle having a source of electric current, of a pocket at the front of the vehicle, a lamp comprising a "bright" light bulb and a "dim" light bulb and mounted movably within the pocket so that it may be shifted from an operative position wherein it faces forwardly outside of the pocket into an inoperative position wherein it is disposed in the pocket and vice versa, means for shifting the lamp into and out of its operative position including a control handle in the operator's compartment of the vehicle and a pulley and flexible cable connection between the handle and the lamp, a conductor for supplying current from the source to the "bright" light bulb, a conductor for supplying current from said source to the "dim" light bulb switch-means in the operator's compartment for selectively controlling the flow of current through said conductors, a spring closed switch in the first mentioned conductor, a spring closed switch in the second mentioned conductor, and a member connected to the cable of the connection and operative automatically and conjointly to open said switches against the action of the springs when the lamp is shifted by the control handle into its inoperative position in the pocket.

9. In a headlight structure for a vehicle, the combination of a pocket at the front of the vehicle, a lamp mounted movably with respect to the pocket so that it may be shifted from an operative position outside of the pocket into an inoperative position in the pocket and vice versa, and means for shifting the lamp into and out of its operative position comprising a manually operable rotatable control member in the operator's compartment of the vehicle, a flexible element leading from the member to the pocket and adapted in response to turning of the member in one direction to shift the lamp into its operative position, and in response to reverse turning of the member to shift the lamp into its inoperative position, and an irreversible clutch device between the member and the adjacent end of the element whereby the element may be moved in either direction by manipulation of the member but is locked against movement except by said member.

10. In a headlight structure for a vehicle, the combination of a pocket located at the front of the vehicle and provided with an opening leading thereto, an electric lamp associated with the pocket and comprising a lens and a reflector, a mounting in the pocket whereby the lamp is shiftable bodily through said opening from an operative position wherein it faces forwardly outside of the pocket into an inoperative position wherein it is disposed wholly within the pocket and vice versa, and a member of the same size and shape as the opening connected to the lamp and extending in back of the reflector and at an acute angle with respect to the lens and arranged so that it serves to close the opening when the lamp is in its inoperative position and further so that when the lamp is shifted into its operative position the inner portion thereof projects into the pocket and laps a part of the mounting.

11. In a headlight structure for a vehicle, the combination of a pocket located at the front of the vehicle and having a bracket therein, a lamp associated with the pocket and having a longitudinally slotted arm-like piece with one end thereof rigidly attached thereto and its other end hinged to the bracket so as to support the lamp so that it may be swung from an inoperative position outside of the pocket and vice versa, and means for swinging the lamp into and out of its operative position comprising a crank arm rotatably mounted on the bracket and having a member at its distal end extending into and co-acting with the slotted portion of said arm-like piece.

12. The combination with an automobile having a hollow strut between one side of the hood and the adjacent fender, of a pocket disposed under said fender and having an opening leading through the latter, an electric lamp associated with the pocket and movably mounted so that it may be shifted from an inoperative position in the pocket to an operative position outside of the pocket and vice versa, and means for shifting the lamp into and out of its operative position comprising a control member in the driver's compartment of the automobile and motion transmitting elements between the member and the lamp having portions thereof extending through the hollow strut.

13. In a headlight structure for a vehicle, the combination of a pocket located at the front of the vehicle and provided with an opening leading thereto, a bracket fixedly secured in the pocket, and an electric lamp connected by a hinged connection to the bracket so that it is shiftable inwardly through said opening from an operative position wherein it faces forwardly outside of the pocket into an inoperative position wherein it is disposed wholly within the pocket and vice versa, and comprising a reflector and lens and a shell extendng around the reflector and consisting of a wall shaped correspondingly to the opening to the pocket and arranged to close said opening when the lamp is in its inoperative position and to extend in an angular position with respect to the pocket and behind the reflector when the lamp is in its operative position, and a pair of laterally spaced pieces extending inwardly from said wall in lapped relation with the reflector and adapted to close the space between the wall and the pocket when the lamp is in its operative position and to fit within the pocket and lap the bracket when the lamp is in its inoperative position.

14. The combination with an automobile having a hood at the front thereof and a front fender with an opening in the side portion thereof that faces the hood, of a pocket disposed under the fender and in registry with the opening, a bracket fixedly secured in the rear portion of the pocket, and an electric lamp hinged to the bracket so that it may be swung sidewise through said opening from an operative position outside of the pocket into an inoperative position in the pocket and vice versa, and comprising a reflector and lens and a shell extending around the reflector and consisting of a side wall shaped conformably to the opening-defining portion of the fender and arranged to close the opening when the lamp is in its inoperative position and to extend outside of the pocket and at an inward and rearward angle with respect to the reflector when the lamp is in its operative position, and top and bottom pieces extending inwardly from the side wall in lapped relation with the reflector and adapted to close the space between said side wall and the pocket when the lamp is in its operative position and to fit within the pocket and lap respectively the top and bottom portions of the bracket when the lamp is in its inoperative position.

15. The combination with an automobile having a hood at the front thereof and a front fender with an opening in the side portion thereof that faces the hood, of a pocket disposed under the fender and in registry with the opening, a lens and reflector equipped electric lamp mounted pivotally with respect to the pocket so that it may be swung outwardly through the opening from an operative position wherein it faces outwardly and is disposed wholly outside of the pocket with the lens thereof substantially centrally positioned with respect to the opening into an inoperative position wherein it is disposed wholly within the pocket and vice versa, said lamp including in addition to the reflector and lens a shell encompassing the reflector and consisting of a side wall shaped correspondingly to the opening to the pocket and adapted to close the same when the lamp is in its inoperative position and to extend outside of the pocket when the lamp is in its operative position, and a pair of laterally spaced pieces extending inwardly from the side wall and in lapped relation with respect to the reflector and adapted to close the space between said side wall and the portion of the opening behind the lens when the lamp is in its operative position and to fit within the pocket when the lamp is in its inoperative position, a cover element mounted movably in the front portion of the pocket so that it is shiftable into a position wherein it closes the portion of the opening in front of the lens when the lamp is in its operative position, and means for automatically moving the element into such position when the lamp is shifted into its said operative position.

16. In a headlight structure for a vehicle, the combination of a pocket at the front of the vehicle, a lamp mounted movably with respect to the pocket so that it may be shifted from an operative position outside of the pocket into an inoperative position in the pocket and vice versa, and means for shifting the lamp into and out of its operative position comprising a manually operable control handle in the operator's compartment of the vehicle, a pulley disposed adjacent to the handle, a cable running from the pulley to the lamp, and a driving connection between the handle and the pulley including a clutch device of the helical spring type, whereby the pulley may be rotated in either direction by manipulation of the handle but is locked against rotation except by said handle.

17. In a headlight structure for a vehcile, the combination of a pocket at the front of the vehicle, an electric lamp mounted movably within the pocket so that it is shiftable from an operative position wherein it faces forwardly outside of the pocket into an inoperative position wherein it is disposed in the pocket and vice-versa, means for shifting the lamp into and out of its operative position including a control handle in the operator's compartment of the vehicle and a pulley and flexible cable connection between the handle and the lamp, a circuit for supplying current to the same, a spring closed switch in said circuit, and an element extending between and connected to the cable and switch and operative automatically to open the switch against the spring when the lamp is shifted by the control handle into its inoperative position in the pocket.

18. In a headlight structure for a vehicle, the combination of a pocket disposed at the front of the vehicle and having a bracket therein, a lamp hinged to said bracket so that it may be swung from an operative position outside of the pocket into an inoperative position in the pocket and vice versa, and means for swinging the lamp into and out of its operative position comprising a pulley carried by the bracket and having a crank arm secured directly thereto and operatively connecting it to the lamp, a manually operable control handle located in the driver's compartment of the vehicle, a pulley positioned adjacent to and connected for drive by the handle, and an endless cable extending between and around the two pulleys and serving to connect the latter so that the crank arm is rotated for lamp swinging purposes in response to manual operation of said control handle.

HAROLD T. AMES.